United States Patent [19]

Laude

[11] 4,204,638

[45] May 27, 1980

[54] PROCESS OF CODING A CARD WITH A DIFFRACTION GRATING HAVING LINES WITH IRREGULAR SPACING

[75] Inventor: Jean-Pierre Laude, St. Cyr, France

[73] Assignee: Instruments S.A., Paris, France

[21] Appl. No.: 11,881

[22] Filed: Feb. 13, 1979

[30] Foreign Application Priority Data

Mar. 2, 1978 [FR] France .................................. 78 05976

[51] Int. Cl.² ........................ G06K 7/12; G06K 19/06
[52] U.S. Cl. .................................... 235/454; 235/487; 365/124
[58] Field of Search ................. 350/3.68, 3.7, DIG. 1; 365/124; 235/494, 487, 457, 454

[56] References Cited

U.S. PATENT DOCUMENTS

| | | | |
|---|---|---|---|
| 3,312,955 | 4/1967 | Lamberts et al. | 365/124 |
| 4,011,435 | 3/1977 | Phelps et al. | 235/487 |
| 4,023,010 | 5/1977 | Horst et al. | 235/487 |
| 4,072,098 | 2/1978 | Granzow | 235/487 |
| 4,143,810 | 3/1979 | Greenway | 235/487 |

Primary Examiner—Daryl W. Cook
Attorney, Agent, or Firm—Haseltine, Lake & Waters

[57] ABSTRACT

A process for coding a set of access cards adapted to control an apparatus for opening, locking or releasing a processing device and for the ultimate determination of the validity of a card when it is presented in the apparatus, the coding being effected by the formation on the cards of at least one diffraction grating whose recognition is effected by projection of a luminous beam on the grating and analysis of the diffracted beams. The grating is formed by means of a machine having a kinematic drive which is intentionally irregularized to produce at least one deviation in the spacing of the lines of the grating which varies periodically with a determined period and maximum amplitude. The modified grating will produce a supplementary satellite diffraction beam when illuminated by the luminous beam and whose angular position and intensity is measured to establish the validity of the grating.

6 Claims, 6 Drawing Figures

PROCESS OF CODING A CARD WITH A DIFFRACTION GRATING HAVING LINES WITH IRREGULAR SPACING

FIELD OF THE INVENTION

The present invention relates to a process for coding access cards adapted to control an apparatus for opening, for locking or for releasing a processing device. It also relates to a process of identification and of recognition of such cards thus coded.

The invention finds a particularly useful application in the field of automatic apparatus requiring great security against counterfeiters. This will be the case, for example, for automatic distributers of cash. This could also be the case, in a more recent application, for telephone apparatus having progressive payment and for which the user must buy cards representing a certain number of units of payment and then introduce one card in the apparatus to initiate its operation, the units of payment then being progressively destroyed at regular intervals according to the length of the communication.

PRIOR ART

The conventional techniques especially utilize magnetic codes as in the case for commutation tickets for certain common transport or for credit cards of plastic material provided with a track of magnetic material and which can give access to automatic distributors of cash. Unfortunately, it is relatively simple for well organized counterfeiters to determine the code inscribed on a card and to reproduce a false card.

It is also known, to obtain a higher degree of security, to employ a coding from an optical diffraction grating, the card then carrying one or more gratings formed, most often, by copying the original gratings. In an apparatus for reading the code to identify the card, the gratings are illuminated by a light beam and diffraction beams are produced in determined directions dependent on the direction of the incident light and on the spacing of the lines of the gratings. It is therefore sufficient for the reading apparatus to include detectors at the locations where there will normally be produced a diffracted beam.

In this respect, therefore, there is produced a coding difficult to imitate if one takes the preliminary precaution of inscribing one or more gratings in a transparent extremely adherent resin material; it then becomes effectively impossible to reproduce the grating by casting, as any attempt to expose the grating by removing the resin which covers it, will lead to the complete destruction of the grating.

However, such coding with gratings still does not provide an absolute security, as a counterfeiter could study the diffraction of the grating from a valid card to determine the constitution of these gratings and reproduce them by mechanical or holographic processes. This obviously assumes the provision of considerable technical means, but one can imagine that this would not be sufficient dissuasion for major criminal organizations, since the ill-gained profits obtained from the counterfeiting could be considerable.

SUMMARY OF THE INVENTION

The present invention contemplates the production of a very important supplementary step to prevent counterfeiting.

The invention is applicable to the coding of a set of access cards adapted to control an apparatus for opening, for locking or for releasing a processing device and for the ultimate recognition of the validity of a card when it is presented in an apparatus, the coding being achieved by the formation on the card of at least one diffraction grating whose identification is effected by the projection of a luminous beam on the grating and analyzing the diffracted beams.

According to the invention, one reserves exclusively for this set of cards, a grating, obtained directly or by copy, by means of a conventional engraving machine for gratings but the operation of which has been intentionally disturbed by introducing, in the mechanism of the machine, at least one deviation whose amplitude varies periodically, with a maximum determined period and amplitude; for the recognition one detects the presence, the position, and the relative intensity of supplementary diffracted light beams produced by the irregularity of the grating. The intensity and the angular position of the supplementary light beams, with respect to the normal diffracted beam, depend, respectively, on the maximum amplitude and the period of error introduced into the engraving machine.

The invention will be better understood by reference to an embodiment given by way of example and shown in the attached drawing. The embodiment given refers to the coding and recognition of cards adapted for the progressive payment of telephone calls at public phone booths.

DETAILED DESCRIPTION

Figure 1:
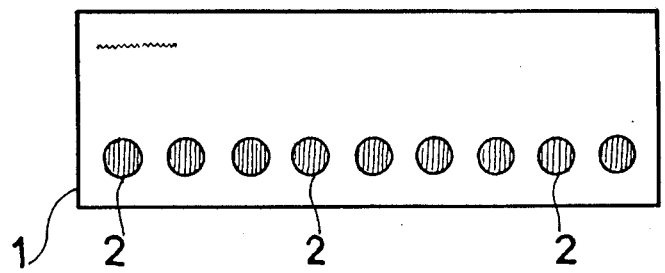
FIG. 1 shows a card carrying coded units of payment according to the invention.

The card 1 (FIG. 1), for example of plastic material, carries a succession of "stamps" 2 which are, in fact, a corresponding number of gratings for diffraction by reflection. Each grating is formed by an impression of lines from a negative matrix, itself formed from an original engraved grating on a conventional machine. The lines are covered in conventional manner by a very thin metallic deposit to form a reflecting surface, itself covered by a transparent resin adhering both to the reflecting surface and to the support of the card in a manner to prevent the exposure of the grating without its descruction. Each stamp-grating represents one unit of payment for telephonic communications and the card can be sold at a ticket counter for the total value which it represents in the same manner that a sale is made for postage stamps to be utilized on mail.

It is additionally noted that all of the gratings formed on all of the cards put widely in circulation (therefore in a probably significant but limited and controlled number) by the issuing organization, will be formed from a copy of a common original grating engraved by a conventional machine for tracing gratings.

Figure 3A:
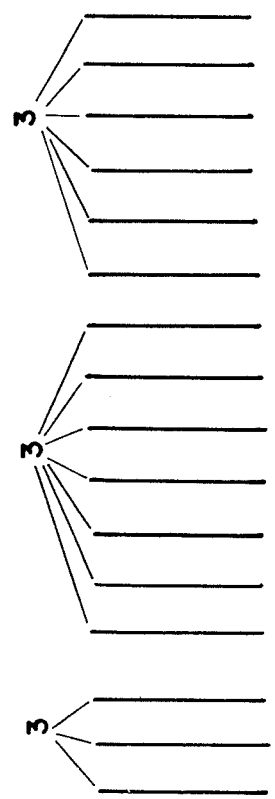
FIG. 3A is an enlarged view of a portion of a diffraction grating with uniformly spaced lines.
Figure 4:
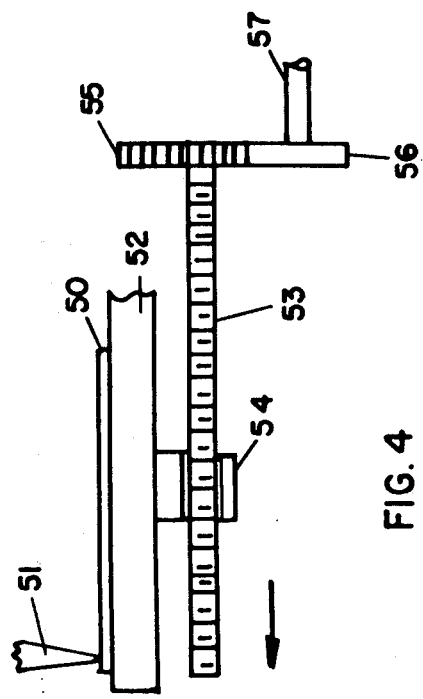
FIG. 4 is a diagrammatic illustration of a portion of apparatus for engraving a diffraction grating.

The realization of an original grating is achieved on apparatus a portion of which is schematically shown in FIG. 4 and wherein equidistantly spaced and absolutely parallel lines are engraved in a support 50, which lines can be from several hundreds to several thousands of lines per milimeter. FIG. 3A shows on greatly enlarged scale a portion of such grating with parallel equally spaced lines 3. The apparatus for forming the gratings are of high precision and comprise a diamond engraving tool 51 which is displaced reciprocally above the support 50 (in a direction into and out of the paper). The support 50 is mounted on a carriage 52 which advances stepwise in the direction of the arrow. The tool 51 is only generally active during the first half-period of its reciprocating movement and the support 50 is displaced one step during the return travel of the second half-period. The control of the position is effected by interferometry.

Figure 3B:
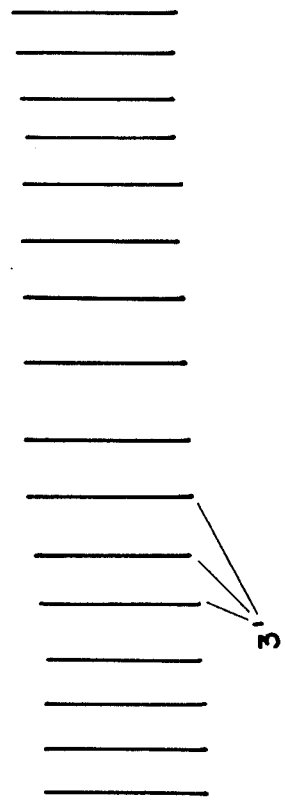
FIG. 3B is an enlarged view of a portion of a diffraction grating with irregularly spaced lines.
Figure 5:
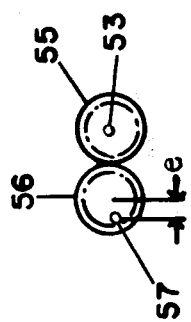
FIG. 5 shows a portion of the apparatus of FIG. 4.

The apparatus for engraving gratings are high precision instruments which can effect spacing between the lines which is extremely regular with a precision of the order of 10Å, but in the embodiment according to the invention, the mechanism for stepwise displacement of the support in intentionally disturbed to superimpose on the normal periodicity of the lines, another periodic variation. For example, FIG. 4 shows a drive screw 53 which threadably engages a nut 54 secured to the carriage 52 and mounted for sliding movement parallel to the screw 53. A gear 55 is secured to screw 53 and is driven by a gear 56 driven by a drive shaft 57. In the normal arrangement, stepwise rotation of gear 56 will produce uniform stepwise travel of support 52 which will result in the uniform spacing of the lines 3 in the grating as shown in FIG. 3A. In order to disturb the normal stepwise displacement of the support, the kinematic drive mechanism of the screw 53 is modified by replacing conventional gear 56 by an eccentrically driven gear 56' as shown in FIG. 5. The gear 56' is identical to gear 56 and the only difference is that gear 56' is eccentrically mounted on shaft 57. The shaft 57 is resiliently supported so that gear 56' constantly remains in mesh with gear 55. As a result thereof, from a reference line of the grating, for example, at the beginning, a progressive diminution of the lines will be obtained in a first half-turn of the eccentric gear and then progressive widening of the spacing will be obtained in the second half-turn such that the reference line will be found in its normal place after a complete rotation of the eccentric gear. The irregularity will continue with the same period. By thus proceeding, one can provide a deviation in the spacing of the lines according to the value of the eccentricity e (FIG. 5) and on the period a deviation according to the number of teeth of the gear 56. The deviation of the spacing of the lines appears on FIG. 3B where the lines are shown at 3' and wherein it is seen in comparison with FIG. 3A that although the total number of lines will be the same, there will be a regular deviation in the spacing of the lines occuring in regular periods and with maximum deviation in spacing over the entire length of the diffraction grating.

One can demonstrate, and experience has shown, that such a periodic deviation leads to the appearance of satellite diffraction beams, or "phantom" beams whose angular spacing from the normal beam of the same order of diffraction is inversely proportional to the period of the deviation and whose intensity is proportional to the square of the maximum amplitude of the deviation, i.e. the maximum change of spacing of the lines of the grating.

In a grating thus intentionally irregularized, the number of lines per millimeter remains unchanged and the directions of the emitted beams in the various orders of diffraction remain unchanged. However, there will appear, in addition, supplementary satellite beams whose direction and intensity will be a function, respectively, of the period and the maximum amplitude of the deviation introduced in the regularity of the spacing of the lines. It is this property that is utilized to recognize, in direction and intensity, the totality of the diffracted beams and to verify that the grating carried on the card is produced from the original grating on the machine which has been intentionally irregularized.

Figure 2:
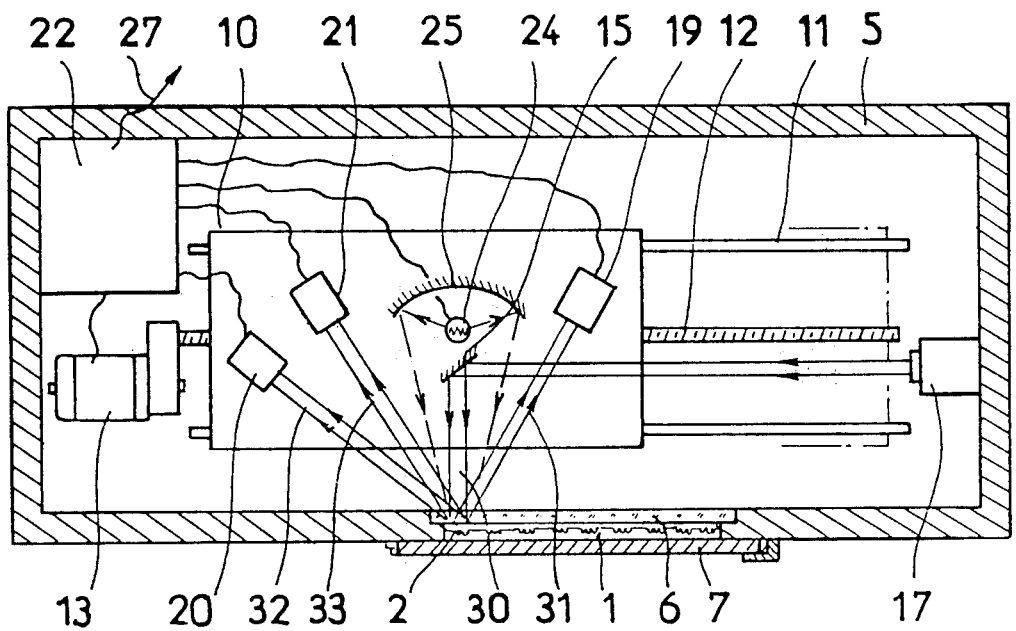
FIG. 2 illustrates in very schematic fashion an apparatus for reading and recognizing such cards, and for progressive destruction of the units of payment.

Referring now to FIG. 2 which schematically shows the examination apparatus, it is noted that this apparatus will hereafter be related to a telephone apparatus of the conventional type for public phone booths (not shown). The recognition apparatus is schematically illustrated by a sealed casing 5 provided with a transparent window 6 on which one places the card 1 maintained in place by a flap 7. The apparatus comprises a carriage 10 movable in translation on rails 11 by means of a drive screw 12 driven by a motor 13. The carriage carries a mirror 15 which reflects a beam from a light souce 17, for example, a helium-neon laser beam, towards the card 1. The carriage 10 also carries three detectors 18, 20 and 21 which are aimed at the card where the laser beam is reflected by the mirror 15.

The detectors 19, 20 and 21 are connected by flexible cables to a computer 22 which also includes members for control of the starting, stopping and reversal of travel of the motor 13. The computer 22 is further connected to an infra-red lamp 24 situated within an elliptical reflector 25 and to a circuit 27 by which it controls the mechanism for placing the telephone apparatus into operation.

When the user places his payment card on the window 6, the first grating 2 carried on the card is illuminated by the incident beam 30 from the laser. A plurality of beams are then diffracted in different orders of diffraction and, for example, beams 31 and 32 which, if the number of lines per millimeter of the grating 2 is that for which the apparatus has been conceived, are diffracted in directions where they respectively strike the detectors 19 and 20.

If, in addition, the grating 2 also has irregularities in the conformation of the original grating, there will also appear supplementary satellite beams such as, for example, the satellite beam 33 of the beam 31 with an angular spacing to strike the detector 21, and with a relative characteristic intensity. The response signals of the detectors 19, 20 and 21 are supplied to the computer 22 where they are recorded with an additional measure of the relation of the intensity between the normal and satellite beams. It is known that this relation of the intensity is a characteristic proper of the authenticity of the gratings 2 since this relation will only take the predetermined value placed in the memory in the computer 22 if the grating 2 is a resulting grating of the copy of the initial grating which has served as the basis for standardization of the entire system. The detection of the appropriate relation and consequently the recognition of the authenticity of the card introduced into the apparatus will be authorized by the production of a signal at output 27 which will initiate the operation of the telephonic apparatus. Simultaneously, the computer 22 will produce illumination of the lamp 24 which will produce a concentrated heated beam on the grating 2 to destroy the same by burning.

At the end of a determined time, corresponding, for example, to the time equivalent of a unit of payment, the motor 13 will be actuated to displace the carriage over a distance corresponding to the spacing between the gratings on the card in order to position the beam 30 on the next grating on the card. The cycle of recognition and of destruction of the properly recognized grating will then follow stepwise with progressive destruction of the grating carried on the card in proportion to the length of the telephone communication which is carried out.

It is seen here that there has been achieved a very high degree of security because the formation of counterfeit cards hereafter would require not only tracing a grating with a desired density of lines but also, disturbing the regularity of the lines by a deviation having exactly the same period and the same maximum amplitude as produced at the time of formation of the actual original grating. Therefore, one would no longer be able to employ simply and engraving machine for gratings of which only about several tens exist in the world, but it would also be necessary to reproduce the characteristics of the irregularity of the grating which is impossible in practice.

It can be seen in contrast that in the example given above, where the irregularity is created by the utilization of a special gear in the engraving machine, it would still be possible to trace a new series of gratings having the same irregularity, but this possibility is strictly reserved solely to the constructor of the original grating.

Of course, the invention is not strictly limited to the embodiment which has been described by way of example, but it also covers embodiments which are distinquished only by details, by variants in execution or by the utilization of equivalent means.

One could thus, by augmenting the number of detectors, study satellite beams in a plurality of orders of diffraction and for each order measure the relation of the relative intensity with the normal corresponding beam.

One could also, instead of using reflection beams described in the example, utilize transmission beams, the recognition apparatus then being consequently modified.

One can also imagine other means to produce the periodic modification of the spacing of the grating and, for example, such means could include local cyclical variations of the temperature of the machine.

Finally, one could simultaneously utilize a plurality of distrubance means cyclically producing different maximum deviations of period and amplitude; this could lead to a still more complex distribution of the satellite beams and consequently, make even more difficult the detection of the characteristics of the deviations.

What is claimed is:

1. In a process for coding a set of access cards adapted to control an apparatus for opening, locking or releasing a processing device and for the ultimate determination of the validity of a card when it is presented in the apparatus, the coding being effected by the formation on the cards of at least one diffraction grating whose recognition is effected by projection of a luminous beam on the grating and analysis of the diffracted beams, the improvement comprising altering the regularity of the grating by producing at least one deviation in the spacing of the lines of the grating which varies periodically with a determined period and maximum amplitude, and detecting the presence of a supplementry satellite diffraction beam produced by the irregularity of the grating when illuminated by said luminous beam to establish the validity of the grating.

2. In a process as claimed in claim 1 comprising detecting both the angular position and the intensity of the supplementary satellite diffraction beam.

3. In a process as claimed in claim 2 wherein the intensity and angular position of the satellite beam in relation to the normal diffraction beams is dependent, respectively, on the maximum amplitude and on the period of the deviation in the grating.

4. In a process as claimed in claim 3 wherein the grating is formed in an engraving machine having a kinematic drive and wherein the deviation in the spacing of the lines of the grating is effected by introducing an irregularity in said kinematic drive.

5. In a process as claimed in claim 1 wherein the deviation in the grating includes several periodic irregularities with different periods and maximum amplitudes.

6. In a process as claimed in claim 3 wherein the grating is formed in an engraving machine and wherein the deviation in the spacing of the lines of the grating is effected by cyclically producing variation of the temperature of the machine.

* * * * *